United States Patent
Nunan et al.

(10) Patent No.: US 7,138,694 B2
(45) Date of Patent: Nov. 21, 2006

(54) SINGLE CRYSTAL SILICON SENSOR WITH ADDITIONAL LAYER AND METHOD OF PRODUCING THE SAME

(75) Inventors: Thomas Kieran Nunan, Carlisle, MA (US); Timothy J. Brosnihan, Natick, MA (US)

(73) Assignee: Analog Devices, Inc., Norwood, MA (US)

( * ) Notice: Subject to any disclaimer, the term of this patent is extended or adjusted under 35 U.S.C. 154(b) by 181 days.

(21) Appl. No.: 10/791,638

(22) Filed: Mar. 2, 2004

(65) Prior Publication Data

US 2005/0196933 A1 Sep. 8, 2005

(51) Int. Cl.
*H01L 29/82* (2006.01)
(52) U.S. Cl. ............... 257/419; 257/415; 257/E29.324
(58) Field of Classification Search ............... 257/415, 257/419, E29.324
See application file for complete search history.

(56) References Cited

U.S. PATENT DOCUMENTS

| | | | |
|---|---|---|---|
| 5,569,621 A | 10/1996 | Yallup et al. | 437/62 |
| 5,939,633 A | 8/1999 | Judy | 73/514.32 |
| 6,465,280 B1 | 10/2002 | Martin et al. | 438/125 |
| 6,505,511 B1 | 1/2003 | Geen et al. | 73/504.12 |
| 2002/0127760 A1 | 9/2002 | Yeh et al. | 438/50 |
| 2004/0129953 A1* | 7/2004 | Tamura et al. | 257/202 |
| 2004/0200281 A1* | 10/2004 | Kenny et al. | 73/514.33 |
| 2005/0170656 A1* | 8/2005 | Nasiri et al. | 438/700 |

FOREIGN PATENT DOCUMENTS

| | | |
|---|---|---|
| EP | 1325885 | 7/2003 |
| WO | WO 99/01155 | 1/1999 |
| WO | WO 00/42231 | 7/2000 |

OTHER PUBLICATIONS

P.-C. Hsu et al. *A High Sensitivity Polysilicon Diaphragm Condensor Microphone*, 1998 MEMS Conference, pp. 1-6, Jan. 25-29, 1998.
Yi et al. *A Micro Active Probe Device Compatible with SOI-CMOS Technologies*, Journal of Microelectromechanical Systems, IEEE Inc., vol. 6, No. 3, Sep. 1987, 7 pages.
Calamita, et al. *Hybrid integration of light emitters and detectors with SOI based Micro-Opto-Electro-Mechanical Systems (MOEMS)*, Proceedings of the SPIE, Silicon-Based and Hybrid Optoelectronics III, Jan. 23-24, 2001, vol. 4293, 2001, pp. 32-45.
Franke et al. *Post-CMOS Integration of Germanium Microstructures*, Micro Electro Mechanical Systems, 1999, MEMS '99, Twelfth IEEE International Conference, Jan. 17-21, 1999, pp. 630-637.
Authorized Officer Katrin Sommermeyer *Invitation to Pay Additional Fees/ Communication Relating to the Results of the Partial International Search*, International Searching Authority, Mar. 30, 2005, 6 pages.

* cited by examiner

*Primary Examiner*—Bradley K. Smith
(74) *Attorney, Agent, or Firm*—Bromberg & Sunstein LLP

(57) ABSTRACT

A SOI-based MEMS device has a base layer, a device layer, and an insulator layer between the base layer and the device layer. The device also has a deposited layer having a portion that is spaced from the device layer. The device layer is between the insulator layer and the deposited layer.

17 Claims, 9 Drawing Sheets

SINGLE CRYSTAL SILICON SENSOR WITH ADDITIONAL LAYER AND METHOD OF PRODUCING THE SAME

FIELD OF THE INVENTION

The invention generally relates to sensors and, more particularly, the invention relates to single crystal silicon sensors.

BACKGROUND OF THE INVENTION

Microelectromechanical systems ("MEMS") are used in a growing number of applications. For example, MEMS currently are implemented as gyroscopes to detect pitch angles of airplanes, and as accelerometers to selectively deploy air bags in automobiles. In simplified terms, many such MEMS devices often have a structure suspended above a substrate, and associated circuitry that both senses movement of the suspended structure and delivers the sensed movement data to one or more external devices (e.g., an external computer). The external device processes the sensed data to calculate the property being measured (e.g., pitch angle or acceleration).

Many types of MEMS sensors, such as those discussed above, are manufactured by means of conventional surface micromachining ("SMM") techniques. As known by those skilled in the art, surface micromachining techniques build material layers on top of a substrate using additive and subtractive processes. Typically, SMM techniques use polysilicon to fabricate the MEMS sensors.

Rather than use polysilicon, however, MEMS sensors also can be fabricated from single crystal silicon. Among other benefits, use of single crystal silicon facilitates integration of circuitry directly on the MEMS wafer. In some applications, however, MEMS sensors produced from single crystal silicon present a set of additional problems. For example, during design and manufacture, it may be more cumbersome to electrically interconnect some parts of the MEMS device. In addition, single crystal silicon MEMS sensors known to the inventors do not permit out of plane sensing and actuation.

SUMMARY OF THE INVENTION

In accordance with one aspect of the invention, a silicon-on-insulator ("SOI") based MEMS device has a base layer, a device layer, and an insulator layer between the base layer and the device layer. The device also has a deposited layer having a portion that is spaced from the device layer. The device layer is between the insulator layer and the deposited layer.

The device may have an anchor extending from the deposited layer to contact the device layer. In some embodiments, the device layer includes circuitry. Such circuitry may be capable of operating after being subjected to the deposition temperature of the deposited layer. For example, the deposited layer may include germanium (e.g., silicon germanium, which has a relatively low deposition temperature).

In some embodiments, an air space separates the device layer from the deposited layer. The device layer also may have a top surface with given material formed thereon (e.g., metal leads). Such embodiments may separate the given material from the deposited layer by means of the air space.

In accordance with another aspect of the invention, a MEMS inertial sensor has a single crystal silicon layer with a top surface, and a deposited additional layer adjacent the top surface of the single crystal silicon layer. The single crystal silicon layer also has sensing structure. The deposited additional layer has a portion that is spaced from the top surface.

The deposited additional layer also may have a portion that contacts the top surface. Moreover, the deposited additional layer may include germanium or other material having a relatively low deposition temperature. The single crystal silicon layer also may be a part of a silicon-on-insulator wafer, where the sensor further includes a base layer and an insulator layer separating the base layer and the single crystal silicon layer.

In some embodiments, the single crystal silicon layer is a part of a bulk silicon wafer. Moreover, the deposited additional layer may form interconnects. In some embodiments, the sensing structure includes a movable member spaced from the deposited additional layer by an air space. In other embodiments, the deposited additional layer forms an electrode capable of capacitively coupling with at least a portion of the single crystal silicon layer.

In accordance with another aspect of the invention, a method of forming an SOI-based MEMS device provides a SOI-based MEMS wafer having a top face, and deposits a sacrificial layer on the top face. The method also deposits an additional MEMS layer on the sacrificial layer.

The additional MEMS layer may include a material having a deposition temperature that is less than about 450 degrees C. Moreover, the method further may remove at least a portion of the sacrificial layer. Among other things, the additional MEMS layer may form a cap for at least a portion of the top face of the SOI-based MEMS wafer. In illustrative embodiments, the method applies surface micromachining processes to the additional MEMS layer.

In accordance with another aspect of the invention, a method of forming a MEMS inertial sensor provides a single crystal wafer having a top face, and then deposits a sacrificial layer on the top face. An additional MEMS layer then is deposited on the sacrificial layer.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Illustrative embodiments of the invention combine single crystal silicon processes with conventional surface micromachining techniques to form a highly functional sensor. More specifically, a sensor formed on a single crystal silicon wafer can have one or more additional deposited layers that can be micromachined to perform a number of supplemental functions. Among other things, an additional deposited layer can form a cap, interconnects between different portions of the sensor, or electrostatic actuation and detection devices. Details of various embodiments are discussed below.

Figure 1:
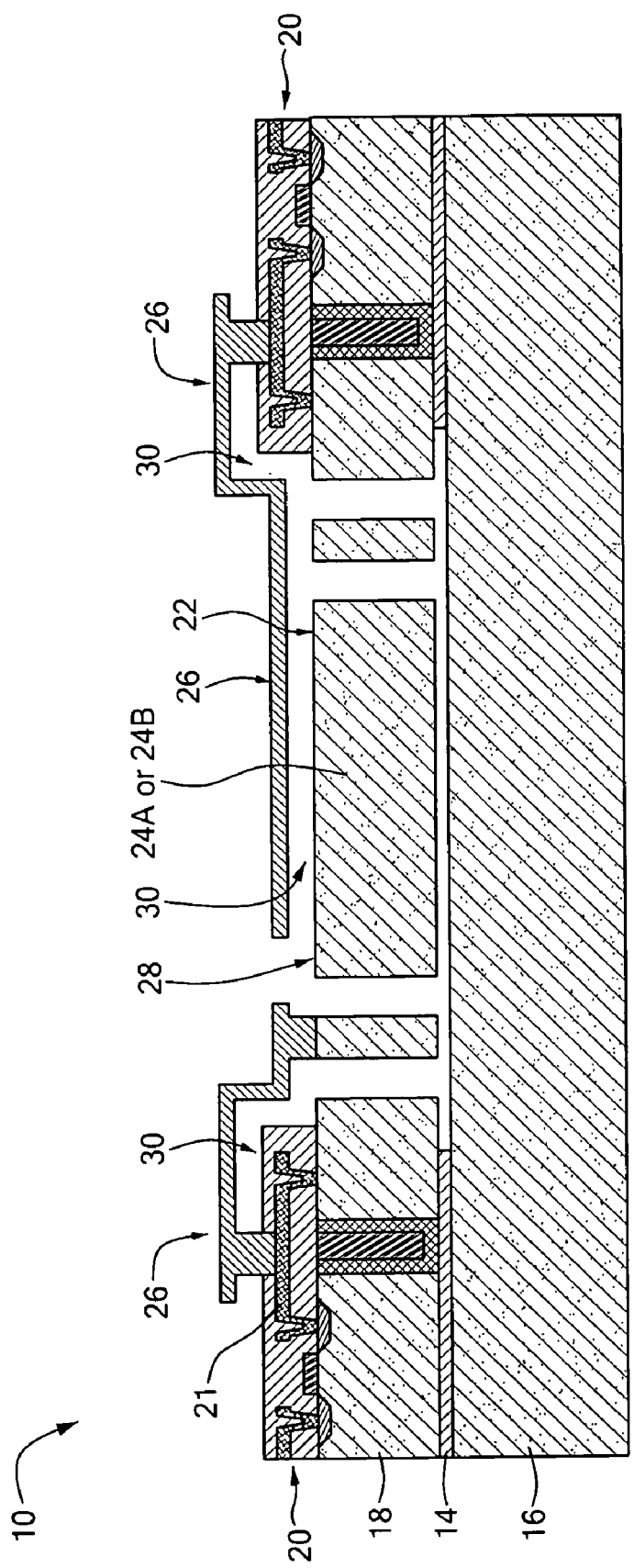
FIG. 1 schematically shows a cross-sectional view of a sensor produced in accordance with illustrative embodiments of the invention.

FIG. 1 schematically shows a cross-sectional view of an inertial sensor ("sensor 10") produced in accordance with illustrative embodiments of the invention. As discussed below, the sensor 10 is formed from a silicon-on-insulator wafer 12 ("SOI"), which has an insulator layer 14 formed between two single crystal silicon wafers. A first of the two wafers, referred to in the art as the "handle wafer 16," supports the insulator layer 14 and the second wafer. The insulator layer 14, typically an oxide, acts as a sacrificial layer during the sensor fabrication process. The second wafer, referred to in the art as the "device layer 18," has both circuitry 20 and movable structure 22 that cooperate to detect sensor movement.

It should be noted that SOI technology is discussed herein as exemplary and is not intended to limit the scope of some embodiments. For example, other technologies implementing single crystal silicon devices can be used.

In illustrative embodiments, the inertial sensor 10 has circuitry 20 and structure 22 to form a MEMS accelerometer or gyroscope. Of course, other embodiments may be used with other types of devices, such as MEMS pressure sensors. In fact, some embodiments may be used with non-MEMS devices or general integrated circuits. Accordingly, discussion of specific types of inertial sensors, such as MEMS accelerometers and gyroscopes, is exemplary and not intended to limit the scope of various embodiments.

When implemented as an accelerometer, the sensor 10 has a normally stable (but movable) mass 24A suspended above the handle wafer 16, and circuitry 20 for detecting mass movement. The circuitry 20 also may include standard transmit circuitry (not shown in detail) for forwarding information relating to detected mass movement to an external device. Alternatively, the circuitry 20 may be distributed across multiple die/wafers. In some such cases, the sensor 10 may have structure 22 only. Illustrative embodiments, however, integrate the accelerometer functionality (structure 22 and circuitry 20) on a single die/wafer. Exemplary MEMS accelerometer functionality includes those distributed and patented by Analog Devices, Inc. of Norwood, Mass. Among others, see U.S. Pat. No. 5,939,633, the disclosure of which is incorporated herein, in its entirety, by reference.

When implemented as a gyroscope, the sensor 10 has an oscillating mass 24B suspended above the handle wafer 16, and circuitry 20 (shown schematically) for actuating and detecting mass movement. In a manner similar to the above noted accelerometers, the circuitry 20 also may include standard transmit circuitry (also not shown) for forwarding information relating to certain mass movement to an external device. Such circuitry 20 may be on-chip or off-chip. As shown in FIG. 1, illustrative embodiments integrate the gyroscope functionality (structure 22 and circuitry 20) on a single sensor 10. Exemplary MEMS gyroscope functionality includes those distributed and patented by Analog Devices, Inc. of Norwood, Mass. Among others, see U.S. Pat. No. 6,505,511, the disclosure of which is incorporated herein, in its entirety, by reference.

In accordance with illustrative embodiments of the invention, the sensor 10 has an additional deposited layer (hereinafter, "additional layer 26") formed over the top surface 28 of the device layer 18. At least an air space 30 separates at least a portion of the additional layer 26 from the top surface 28 of the device layer 18. Other components essentially integrated into the device layer 18 thus may be located between that portion of the additional layer 26 and the top surface 28 (e.g., circuitry 20, such as gate polysilicon and metal leads 21 between circuit elements). To facilitate fabrication, the additional layer 26 illustratively is comprised of a material that conventional micromachining techniques can readily process. For example, the additional layer 26 may be a germanium based material, such as silicon germanium (SiGe).

As noted above and below, the additional layer 26 may be used for a number of different purposes, such as to electrically interconnect parts of the device layer 18, to act as a cap (providing either a hermetic or non-hermetic seal), or to provide electrostatic actuation and detection. In fact, more than one additional layer 26 may be formed for additional functionality. For example, conventional surface micromachining processes may form a second MEMS sensor above the sensor 10 formed on the SOI wafer 12.

Figure 2:
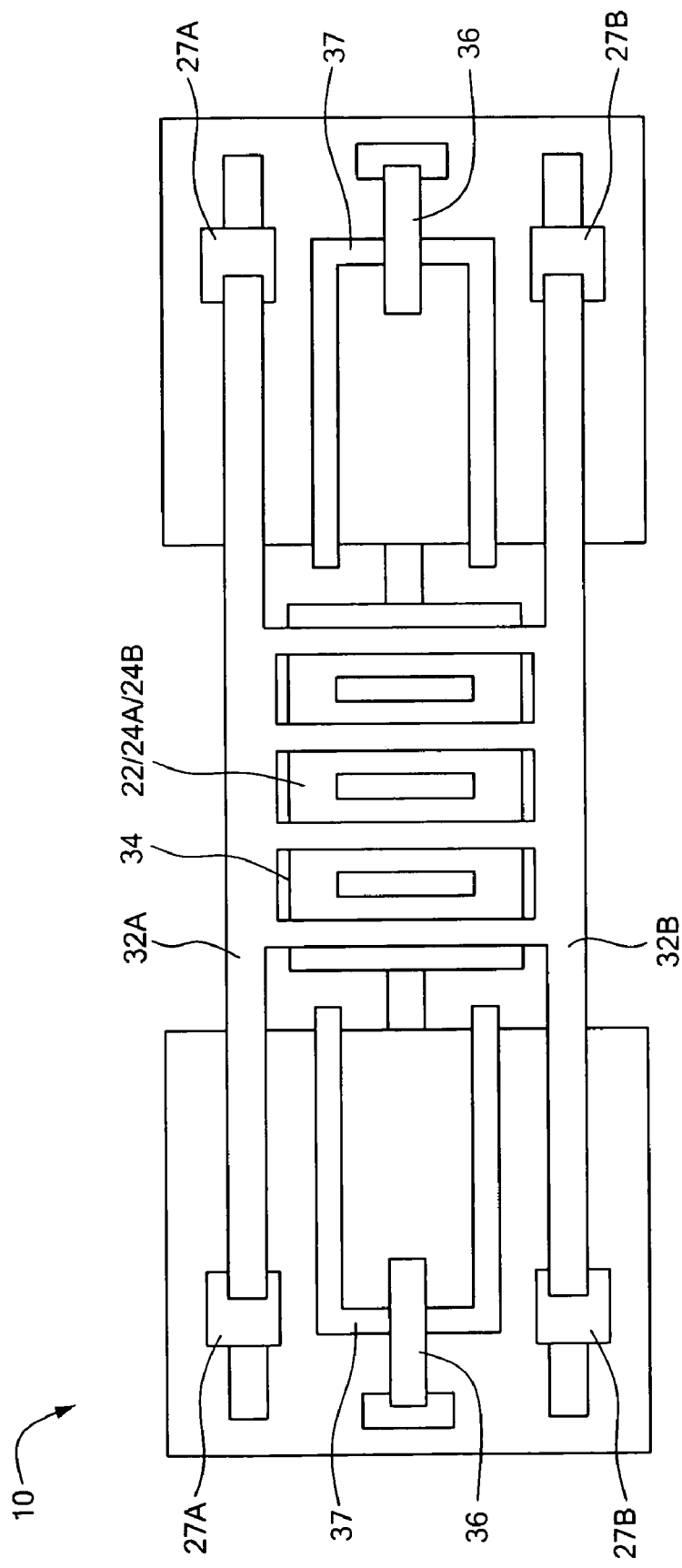
FIG. 2 schematically shows a partial top view of the sensor shown in FIG. 1.

FIG. 2, which schematically shows a top view of the sensor 10 of FIG. 1, illustrates exemplary uses of the additional layer 26. Specifically, the additional layer 26 shown includes a first interconnect 32A that couples a first pair of opposed metal contacts 27A, and a second interconnect 32B that couples a second pair of opposed metal contacts 27B. The additional layer 26 also has a grid 34 for electrostatically detecting movement of the mass 24A or 24B. Alternatively, the grid could electrostatically actuate mass 24A or 24B.

Moreover, the additional layer 26 also has a pair of jumpers 36 that electrically connect isolated portions of the device layer 18 across respective air filled trenches 37. This arrangement should minimize parasitic capacitance produced by prior art nitride filled trenches due to the significantly lower dielectric constant of air.

Figure 3:
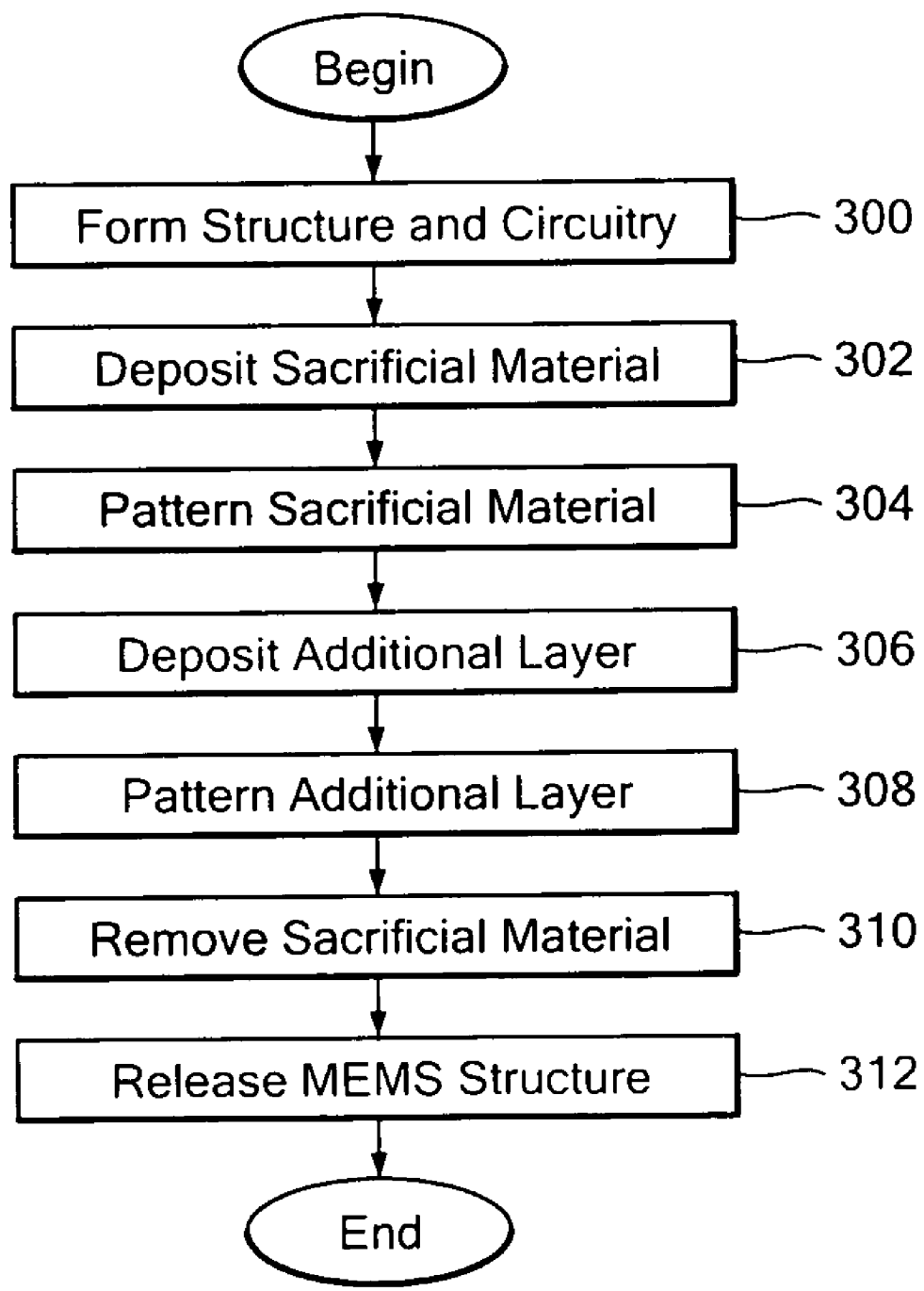
FIG. 3 shows a process of forming the sensor shown in FIG. 1 in accordance with illustrative embodiments of the invention.
Figure 4:
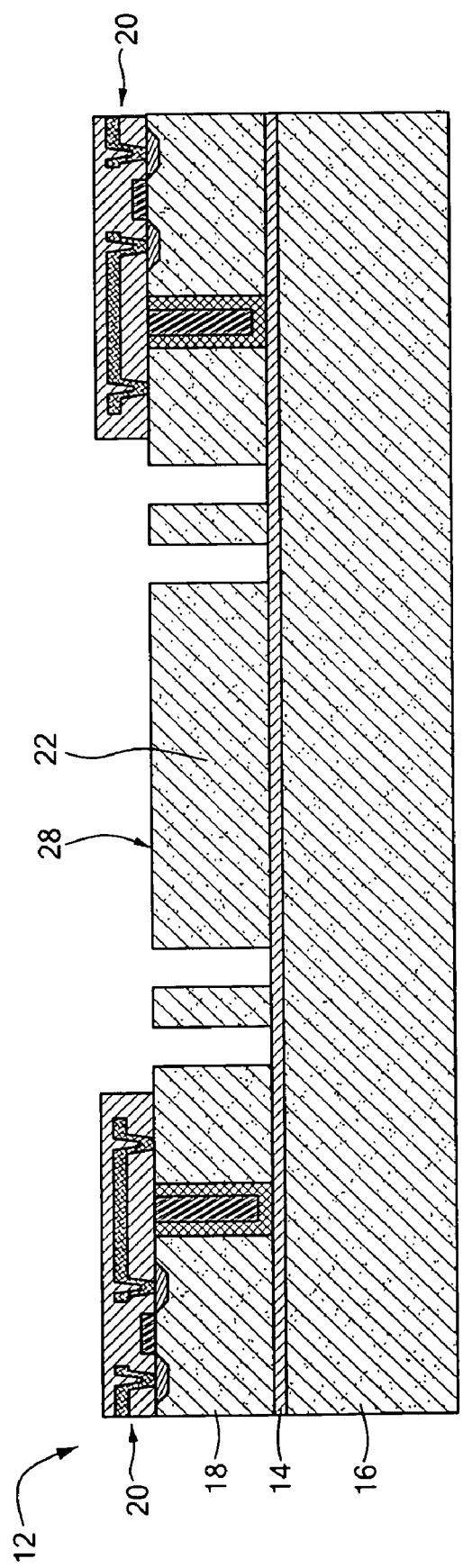
FIG. 4 schematically shows the sensor of FIG. 1 during a stage of production (i.e., during step 300 of FIG. 3).

FIG. 3 shows an illustrative process of fabricating the sensor 10 shown in FIG. 1. FIGS. 4–9 illustrate this process by showing intermediate steps as the sensor 10 is fabricated. This process may be performed on a single SOI wafer 12, or on a bulk wafer that is diced at a later stage. The process begins at step 300, in which conventional processes form structure 22 and circuitry 20 on/into the device layer 18 of the SOI wafer 12. See, for example, FIG. 4, which shows the SOI wafer 12 with corresponding circuitry 20 and structure 22. More specifically, conventional SOI processes both etch, but do not release, beams on the device layer 18 and form the necessary circuitry 20. For a method of producing an exemplary SOI device, see commonly owned U.S. Pat. No. 5,569,621, the disclosure of which is incorporated herein, in its entirety, by reference.

Figure 5:
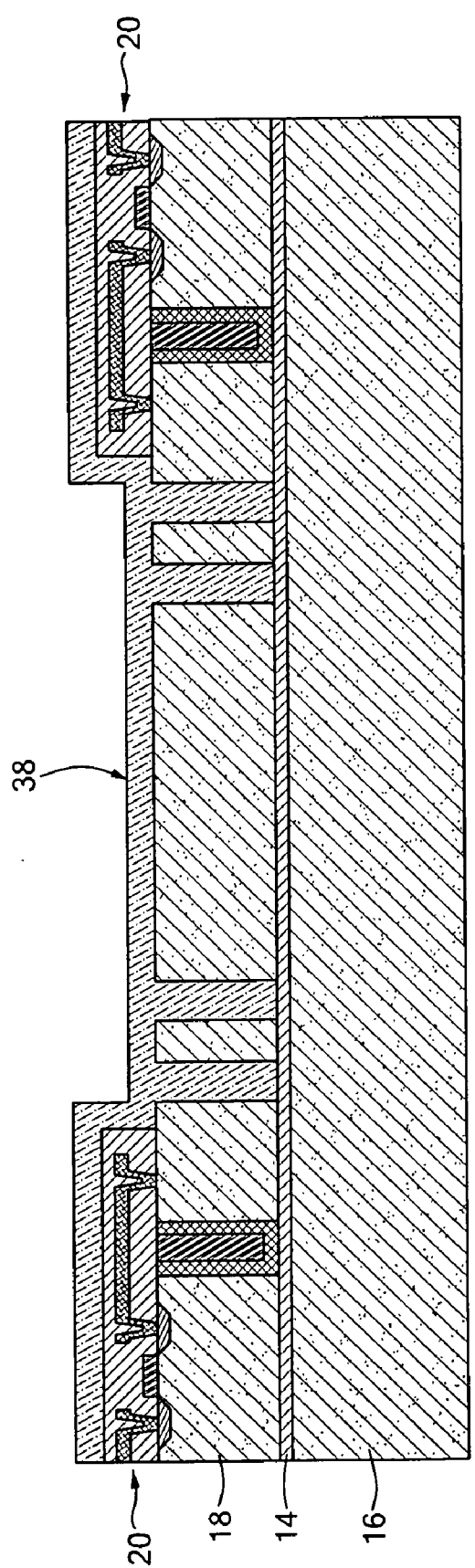
FIG. 5 schematically shows the sensor of FIG. 1 during a stage of production (i.e., during step 302 of FIG. 3).

The process then continues to step 302, in which a low temperature sacrificial material 38 is deposited onto the top surface 28 of the device layer 18. As shown in FIG. 5, this sacrificial material 38 fills beam gaps and other portions etched during previous process steps. Among other things, the sacrificial material 38 may be an oxide, germanium, plated metal, polyimide or other organic material.

Figure 6:
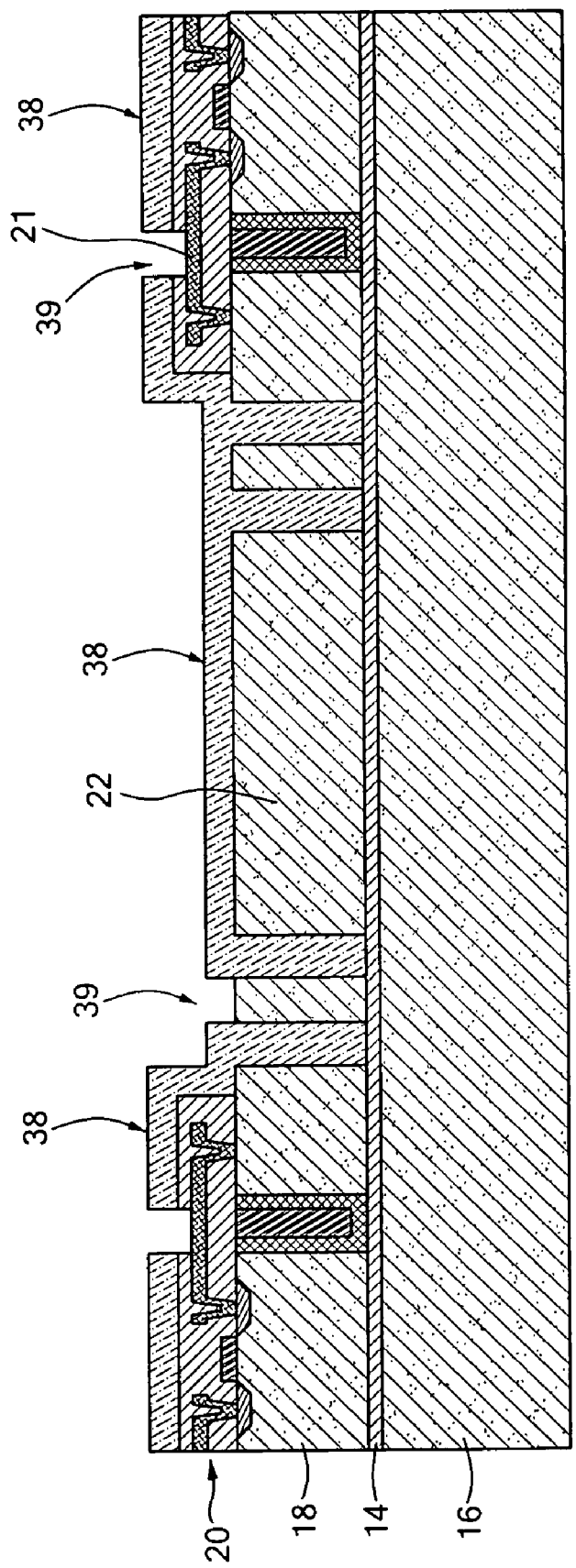
FIG. 6 schematically shows the sensor of FIG. 1 during a stage of production (i.e., during step 304 of FIG. 3).

After it is deposited, the process begins patterning the sacrificial material 38 to act as templates for subsequently formed anchors, contacts, or other structure 22 to be produced by the additional layer 26 (step 304). For example, FIG. 6 shows holes 39 for contact to metal leads 21 in the circuitry 20 and to the single crystal silicon. Moreover, after patterning the sacrificial material 38, the process may etch portions of the top surface 28 of the device layer 18, such as a dielectric formed over a metal contact.

Figure 7:
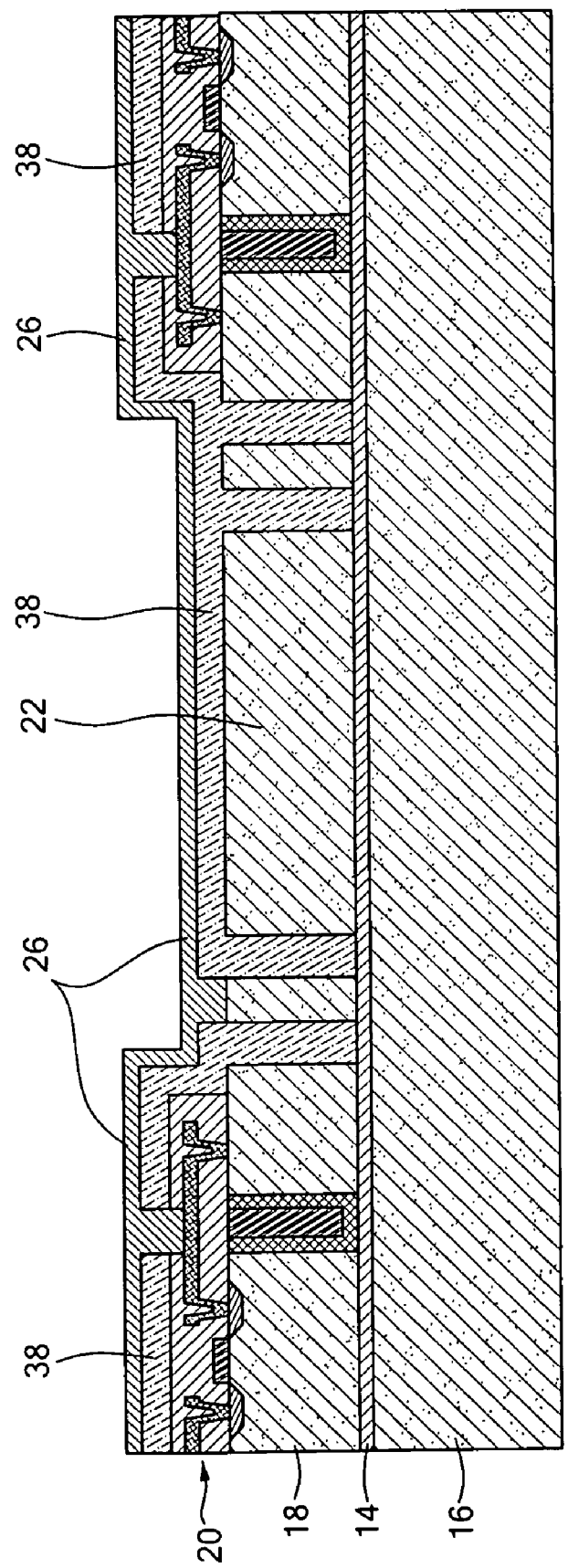
FIG. 7 schematically shows the sensor of FIG. 1 during a stage of production (i.e., during step 306 of FIG. 3).

The process then continues to step 306, in which conventional processes deposit the additional layer 26 onto the top of the sacrificial material 38 (see FIG. 7). In illustrative embodiments, the sacrificial material 38 has a deposition temperature that should not adversely impact the maximum tolerable temperature of components in the device layer 18. For example, the deposition temperature should be low enough to not adversely affect the circuitry 20. In some embodiments, the circuitry 20 is capable of substantially normal operation even after being subjected to temperatures of up to about 450 degrees C. Accordingly, due to its relatively low deposition temperature, illustrative embodiments use silicon germanium as the additional layer 26. The relative concentrations of polysilicon and germanium are selected to ensure that the deposition temperature of the additional layer 26 does not exceed about 450 degrees C.

Rather than use a germanium based material, the additional layer 26 could be formed from another material. For example, in embodiments that do not include circuitry 20, the additional layer 26 could be formed from polysilicon, which has a higher deposition temperature than that of silicon germanium. If used as a particle shield (i.e., without a hermetic seal), a dielectric material can be used, such as silicon dioxide or silicon nitride. Other embodiments may use metal.

Figure 8:
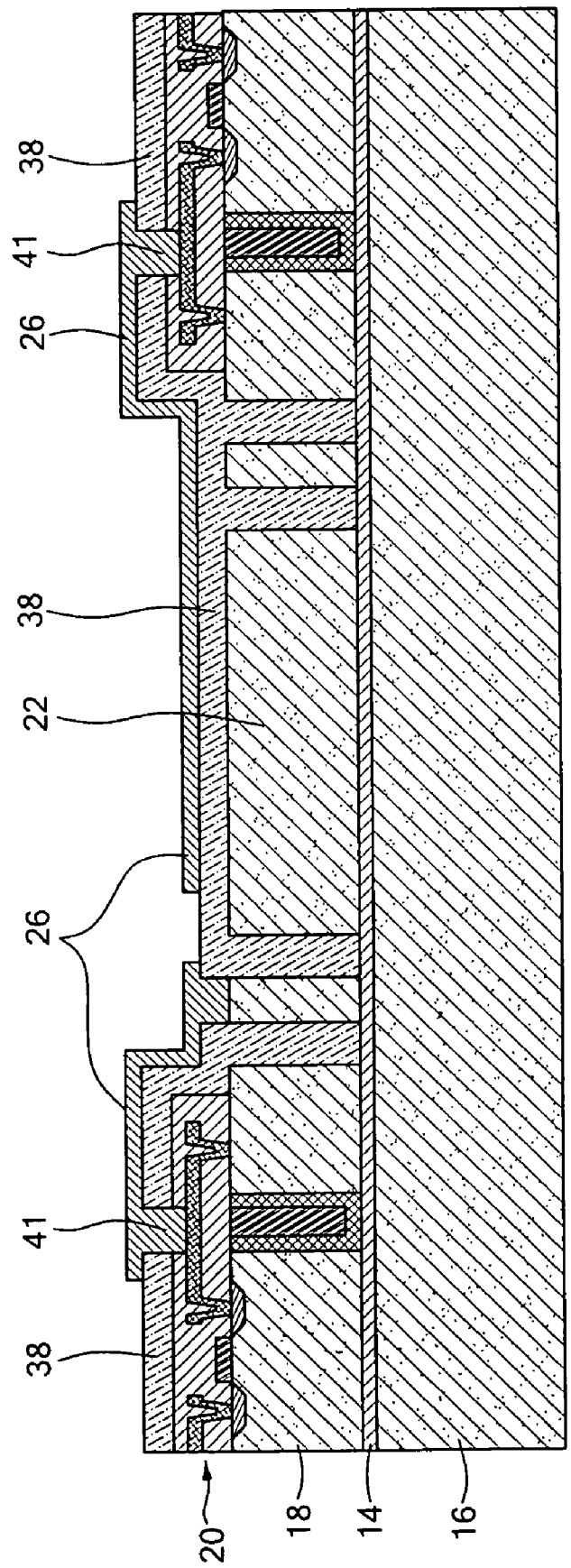
FIG. 8 schematically shows the sensor of FIG. 1 during a stage of production (i.e., during step 308 of FIG. 3).

The process then continues to step 308, in which conventional surface micromachining processes pattern the deposited material (i.e., the additional layer 26) to form the desired structure 22. For example, as shown in FIGS. 2 and 8, the deposited material may be patterned to form an anchor, an upper electrode, cap, or particle shield. As shown in FIG. 8, the anchor 41 may extend and contact the device layer 18 to form an electrical connection.

Figure 9:
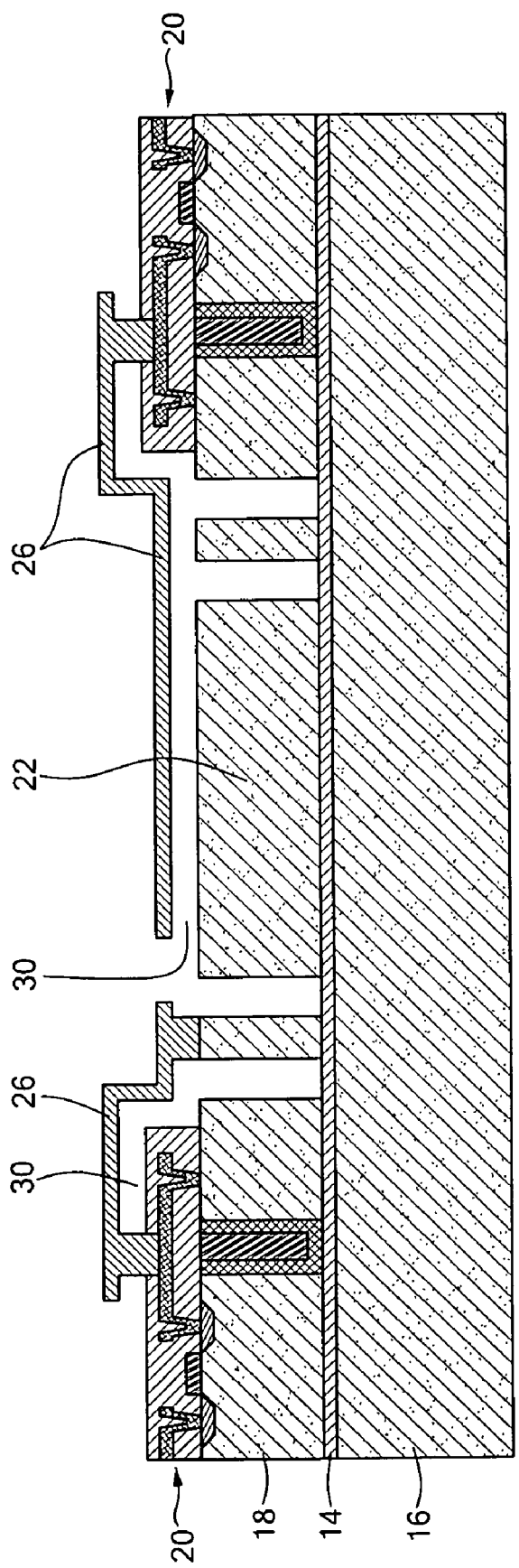
FIG. 9 schematically shows the sensor of FIG. 1 during a stage of production (i.e., during step 310 of FIG. 3).

After it patterns the deposited material, the process then removes the sacrificial material 38 in accordance with conventional processes (step 310, FIG. 9). If the sacrificial material 38 is germanium, then a number of etchants typically used for germanium etching may be used. For example, hydrogen peroxide may be used. Alternatively, the process may use oxygen plasma if the sacrificial material 38 is an organic. Removal of the sacrificial material 38 forms an air space 30 between the deposited material and the top surface 28 of the device layer 18. In other words, the air space 30 effectively spaces the additional layer components (formed by first etching the deposited material and then removing the sacrificial material 38) from the top surface 28 of the device layer 18.

Finally, the process ends after step 312 by releasing the MEMS structures in the device layer 18. If the deposited material merely forms simple interconnects and anchors, existing resist pedestal release processes may be used. If it forms a cap, however, a vapor hydrofluoric acid or other technique may be used. Those in the art should be capable of selecting the appropriate release process. Those discussed above are merely exemplary of various embodiments.

Those in the art understand that other steps can be performed in addition to those discussed above. For example, various preprocessing (e.g., preparing the SOI-wafer 12) and post-processing steps (e.g., testing, packaging, etc . . . ) can be performed.

As noted above, rather than have a single additional layer 26, some embodiments have multiple additional layers. Aspects of this process thus can be used to fabricate such a multi-layer device. Accordingly, additional deposited and sacrificial layers can be added and still be consistent with the goals of various aspects of the invention.

Illustrative embodiments of the invention thus enable single crystal based sensors to perform out of plane actuation and sensing (i.e., perpendicular to the plane of the mass 24A or 24B). In addition, illustrative embodiments also enable such sensors to more easily interconnect various portions of the device layer 18. Due to their fabrication methods (discussed above), some of those interconnects enable use of an air filled trench (e.g., see FIG. 2) between isolated portions of the device layer 18 rather than a material filled trench (e.g., nitride filled). Moreover, as also noted above, some embodiments form robust in-situ caps.

Although the above discussion discloses various exemplary embodiments of the invention, it should be apparent that those skilled in the art can make various modifications that will achieve some of the advantages of the invention without departing from the true scope of the invention.

What is claimed is:

1. A SOI-based MEMS device comprising:
   a base layer;
   a device layer;
   an insulator layer between the base layer and the device layer; and
   a deposited layer having a portion that is spaced from the device layer;
   the device layer being between the insulator layer and the deposited layer,
   the device layer having structure, the deposited layer forming a cap to seal the structure,
   wherein the deposited layer includes germanium.

2. The MEMS device as defined by claim 1 further including an anchor extending from the deposited layer to contact the device layer.

3. The MEMS device as defined by claim 1 wherein the device layer includes circuitry.

4. The MEMS device as defined by claim 3 wherein the deposited layer includes a material having a deposition temperature, the circuitry being capable of operating after being subjected to the deposition temperature.

5. The MEMS device as defined by claim 1 wherein an air space separates the device layer from the deposited layer.

6. The MEMS device as defined by claim 5 wherein the device layer has a top surface with given material formed thereon, the air space separating the given material from the deposited layer.

7. A MEMS inertial sensor comprising:
   a single crystal silicon layer having a top surface, the single crystal silicon layer also having sensing structure and a second component; and
   a deposited additional layer adjacent to the top surface of the single crystal silicon layer, the deposited additional layer having a portion that is spaced from the top surface, the deposited additional layer being conductive to serve as an interconnect for the sensing structure on the single crystal silicon layer, the deposited additional layer electrically connecting the sensing structure with the second component
   wherein the sensing structure includes a movable member spaced from the deposited additional layer by an air space.

8. The MEMS inertial sensor as defined by claim 7 wherein the deposited additional layer has a portion that is contacts the top surface.

9. The MEMS inertial sensor as defined by claim 7 wherein the single crystal silicon layer is a part of a silicon-on-insulator wafer, the sensor further including a base layer and an insulator layer separating the base layer and the single crystal silicon layer.

10. The MEMS inertial sensor as defined by claim 7 wherein the single crystal silicon layer is a bulk silicon wafer.

11. The MEMS inertial sensor as defined by claim 7 wherein at least an air space separates the top surface from the deposited additional layer.

12. The MEMS inertial sensor as defined by claim 7 wherein the second component includes circuitry, the deposited additional layer electrically connecting the sensing structure with the circuitry.

13. A SOI-based MEMS device comprising:
a base layer;
a device layer;
an insulator layer between the base layer and the device layer; and
a deposited layer having a portion that is spaced from the device layer;
the device layer being between the insulator layer and the deposited layer,
the device layer having structure, the deposited layer forming a cap to seal the structure,
wherein an air space separates the device layer from the deposited layer,
further wherein the device layer has a top surface with given material formed thereon, the air space separating the given material from the deposited layer.

14. The MEMS device as defined by claim 13 further including an anchor extending from the deposited layer to contact the device layer.

15. The MEMS device as defined by claim 13 wherein the device layer includes circuitry.

16. The MEMS device as defined by claim 15 wherein the deposited layer includes a material having a deposition temperature, the circuitry being capable of operating after being subjected to the deposition temperature.

17. The MEMS device as defined by claim 13 wherein the deposited layer includes germanium.

* * * * *